United States Patent [19]
Johnson

[11] 3,901,335
[45] Aug. 26, 1975

[54] ENDLESS TRACK VEHICLE AND COOLING SYSTEM THEREFOR

[75] Inventor: Thomas B. Johnson, Humble, Tex.

[73] Assignee: Armco Steel Corporation, Middletown, Ohio

[22] Filed: Aug. 29, 1974

[21] Appl. No.: 501,757

[52] U.S. Cl. ............ 180/5 R; 180/54 A; 180/68 R
[51] Int. Cl.² ................. B62M 27/02; B62K 11/04
[58] Field of Search ............ 180/5 R, 6, 9.2, 68 R, 180/54 A

[56] References Cited
UNITED STATES PATENTS 3,367,410  2/1968  Kendrick ........................... 165/41
3,835,948  9/1974  Duclo ................................. 180/5 R Primary Examiner—Philip Goodman
Attorney, Agent, or Firm—Roylance, Abrams, Berdo & Kaul

[57] ABSTRACT

An endless track vehicle of the snowmobile type, driven by a liquid-cooled engine, includes a heat exchanger assembly for the engine's liquid coolant located above the top run of the endless track, the endless track having ribs thereon. Orbital movement of the endless track causes a flow of air, ice, snow and water to be moved into contact with the bottom of the heat exchanger assembly, thereby enhancing the cooling of the liquid coolant in the heat exchanger assembly.

16 Claims, 10 Drawing Figures

ENDLESS TRACK VEHICLE AND COOLING SYSTEM THEREFOR

The present invention relates to cooling systems for endless track vehicles and more particularly relates to a heat exchanger assembly utilized in snowmobile vehicles having liquid-cooled engines.

In the past, endless track vehicles of the type commonly called snowmobiles have been powered by air-cooled internal combustion engines. The basic reason for such a cooling system is the extreme cold in which these vehicles are usually operated. However, due to recent strict governmental regulations concerning noise reduction and due to fuel scarcity, it is considered that a liquid-cooled engine for use in snowmobiles would be advantageous because liquid-cooled engines are known to be more efficient in fuel consumption and quieter in operation.

Since most of the previously designed and constructed snowmobiles utilize the air-cooled engine, a complete redesigning of these vehicles to incorporate a grill and a radiator for the liquid-cooling system is considered economically undesirable.

Accordingly, it is a main object of the present invention to provide a liquid-cooled engine in a snowmobile which requires the smallest amount of known snowmobile redesign.

Another object is to provide a more efficient power plant to propel snowmobiles.

A further object is to provide a power plant which is quieter than conventional snowmobile power plants.

A further object is to provide a cooling system for a liquid-cooled engine mounted on a snowmobile which does not require a radiator and grill.

A further object is to provide a liquid-cooled engine in a snowmobile in combination with a heat exchanger assembly for efficiently releasing the waste heat produced by the engine.

SUMMARY OF THE INVENTION

The foregoing objects are attained by providing the endless track vehicle with a heat exchanger assembly for cooling the engine's liquid coolant therein. Mounted on the vehicle frame is the liquid cooled engine and a guide assembly for guiding the endless track in orbital movement which includes a top and bottom run. A conventional drive mechanism is utilized to couple the output of the engine with the endless track for driving the track in the orbital movement. The heat exchanger assembly is coupled to the liquid-cooled engine so that the liquid coolant may be circulated therebetween. The heat exchanger assembly is positioned above and directly communicates with the top run of the endless track so that the bottom surface of the heat exchanger assembly is cooled via contact with convection currents of air generated by the movement of the ribs on the endless track and via contact with streams of cold water, ice and snow thrown by the ribs during movement of the endless track. In three embodiments of the present invention, the heat exchanger assembly is mounted on a central portion of the vehicle frame and directly communicates with the top run of the endless track via elongated slots formed in that central portion. In a fourth embodiment, the central portion of the vehicle frame forms the bottom surface of the heat exchanger assembly and it directly communicates with the top run of the endless track.

Other objects, advantages and salient features of the present invention will become apparent from the following detailed description which, taken in conjunction with the annexed drawings, discloses preferred embodiments of the present invention.

BRIEF DESCRIPTION OF THE DRAWINGS

Referring now to the drawings which form a part of this original disclosure.

DESCRIPTION OF THE PREFERRED EMBODIMENTS

Figure 1:
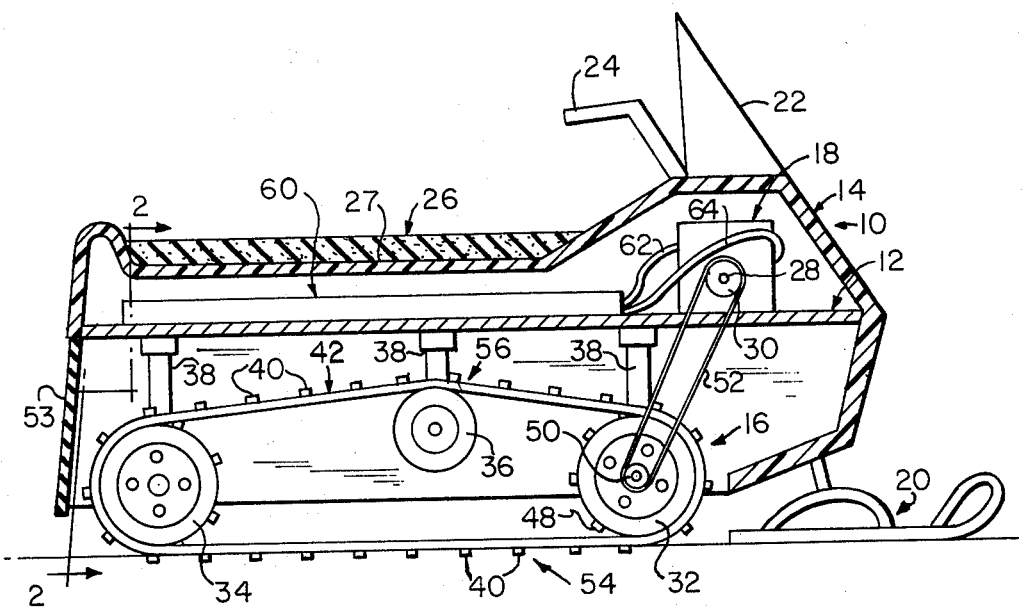
FIG. 1 is a vertical sectional view in side elevation of an endless track vehicle in accordance with the present invention.

Referring to the drawings in further detail, as shown in FIG. 1 the endless track vehicle 10 includes a vehicle frame 12, an outer skin 14, an endless track 16, a liquid cooled engine 18, and a pair of skis 20 (only one of which is shown).

The vehicle frame 12 is preferably formed from rigid and structurally strong material and is surrounded by the outer skin 14 which can be formed of plastic and is coupled to the frame. The vehicle 10 includes a windshield 22 and a pair of handle-bars 24 which are conventionally connected to the skis 20 for suitable steering of the vehicle. Mounted on the top rear portion 27 of the outer skin 14 is a cushioned seat 26 which can extend for most of the length of the vehicle. The liquid-cooled engine, which can be a conventional internal combustion engine, is suitably mounted on the front portion of the vehicle frame 12 below the windshield and has an output shaft 28 rigidly connected to an output pulley 30.

Figure 2:
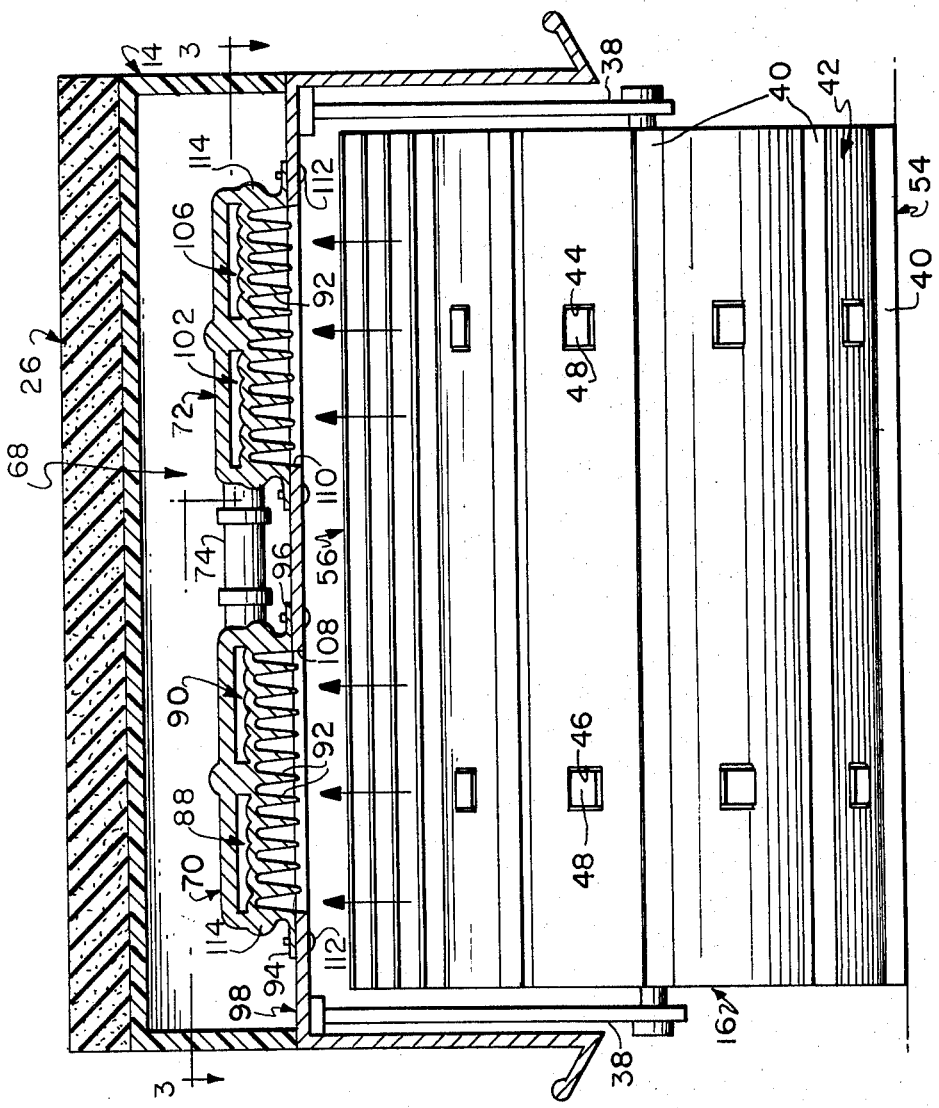
FIG. 2 is a sectional view taken along lines 2—2 in FIG. 1 and shows a first embodiment of the heat exchanger assembly in accordance with the present invention.

As shown in FIGS. 1 and 2, the endless track 16 is supported on a guide assembly formed by a front sprocket wheel 32, a rear sprocket wheel 34, and a bogie wheel 36. These wheels are suitably supported for rotation to the vehicle frame 12 such as by support brackets 38 which are secured at the top portions thereof to the vehicle frame 12 and which rotatably receive the ends of suitable axles upon which the wheels are supported. Although it is customary to provide a suspension system in endless track vehicles of this type, for purposes of simplicity only the rigid support brackets 38 are shown, such a suspension system not forming part of this invention.

The endless track 16 is flexible and can be formed of any suitable material such as rubber or plastic. The track 16 has a plurality of spaced ribs 40 which extend upwardly from the exterior surface 42 of the track. These ribs are evenly spaced along this exterior surface and not only provide traction to the endless track but, as will be described in more detail hereinafter, assist in providing added cooling to the heat exchanger assembly.

As shown in FIG. 2, these ribs 40 extend along the full width of the endless track, are effectively parallel to one another and are effectively perpendicular to the planes containing the edges of the endless track. Two holes 44 and 46 are provided in the endless track between each set of adjacent ribs 40 in a position such that the sprockets 48 on the sprocket wheels 32 and 34 can be received therein so that rotation of the sprocket wheels will cause a concomitant rotation or orbital movement of the endless track 16. As shown in FIG. 2, these holes 44 and 46 are substantially evenly spaced along the width of the endless track 16.

Referring again to FIG. 1, the front sprocket wheel 32 has a pulley 50 coupled thereto which is in turn coupled to the output pulley 30 located on the engine 18 via a belt or chain 52. Thus, rotation of the output pulley 30 causes rotation of the front sprocket wheel 32 which in turn causes orbital movement of the endless track 16 around the guide mechanism formed by the front sprocket wheel, the rear sprocket wheel and the bogie wheel. Preferably, as shown in FIG. 1, the front sprocket wheel is located just aft of the skis 20 and substantially directly below the engine 18. The rear sprocket wheel 34 is located slightly forward of a flexible, waterproof skirt 53 at the end of the vehicle with the bogie wheel 36 located in between the front and rear sprocket wheels. The skirt 53 is preferably made of rubber and extends across the back of the vehicle and downward to a position below the axis of rotation of the rear sprocket 34. The bottom periphery of the sprocket wheels 32 and 34 are in substantially the same horizontal plane such that the bottom run 54 of the endless track therebetween is substantially planar. This bottom run rests on the snow or similar surface upon which the vehicle is operating.

The bogie wheel 36 has its uppermost portion of its outer periphery located slightly above the plane containing the top peripheries of the front and rear sprocket wheels so that the top run 56 of the endless track 16 consists of two portions which are non-coplanar.

This bogie wheel suppport, as illustrated in FIG. 1, should be considered exemplary, with any conventional support for the endless track 16 being sufficient as long as it provides the two non-coplanar portions on the top run 56 which aid in delivering cold air, water, ice and snow onto the bottom of the heat exchanger, as described in more detail hereinafter.

As best shown in FIG. 1, the heat exchanger assembly 60 is mounted on the top of the vehicle frame 12 and extends from a position adjacent the engine 18 and above wheel 32 in the forward portion of the vehicle to substantially the end of the vehicle and above wheel 34. The heat exchanger assembly 60 and the engine 18 are interconnected by means of a first conduit 62 and a second conduit 64. The first conduit is connected to the engine in a conventional fashion such that the coolant liquid, which can be water with an antifreeze agent therein, is pumped out of the engine along the first conduit and then into the heat exchanger assembly 60. The second conduit 64 is coupled to the outlet of the heat exchanger assembly and conducts the liquid coolant from that assembly back to the engine 18. Although not shown, it is contemplated that the liquid-cooled engine 18 contains a conventional pump for establishing the circulation of the coolant liquid between the engine and the heat exchanger assembly.

In the embodiment of the vehicle 10 shown in FIG. 1, the cushioned seat 26 rests on portion 27 of the outer skin 14 located above and space from the top of the heat exchanger 60.

Figure 3:
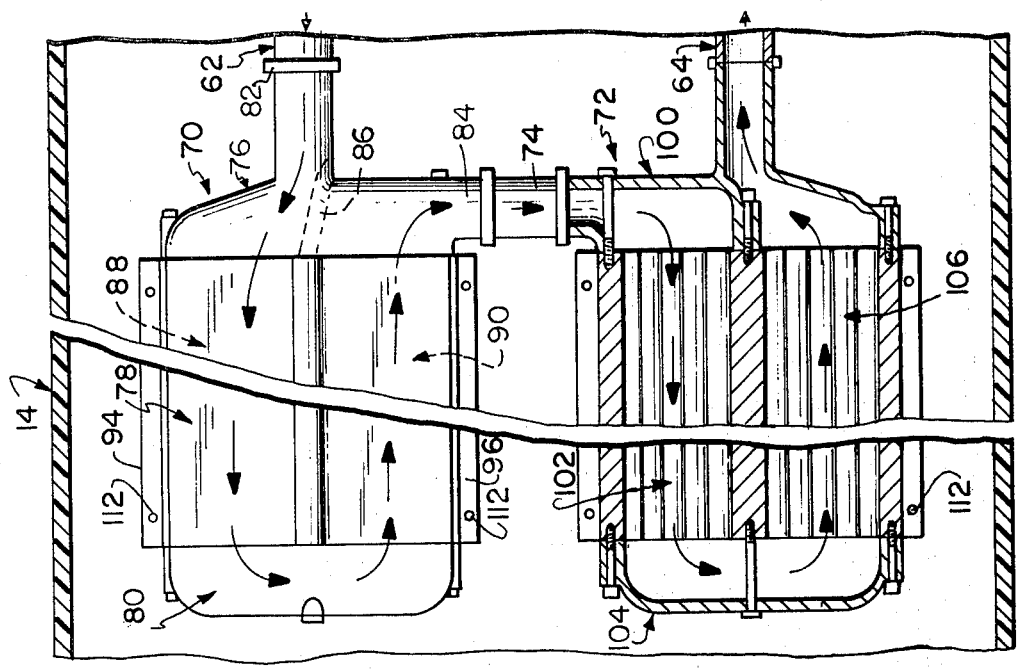
FIG. 3 is a fragmentary top plan, sectional view taken along lines 3—3 in FIG. 2 and shows the first embodiment of the heat exchanger assembly.

Referring now to FIGS. 2 and 3, the first embodiment of the heat exchanger assembly 60 is shown as comprising a housing 68 including two similar portions 70 and 72 interconnected via a connecting conduit 74. Portion 70 is comprised of a forward piece 76, a midsection 78, and an end cap 80.

The forward piece 76 of portion 70 has a pipe coupling 82 connected to the first conduit 62 of the circulation assembly such that the liquid coolant from the engine 18 flows through the first conduit into the portion 70 of the heat exchanger assembly. The forward piece 76 also has an outlet pipe 84 which is connected to the connecting conduit 74 between portions 70 and 72. A deflecting wall 86 is positioned within the forward piece 76 so that the coolant liquid entering portion 70 via pipe coupling 82 is directed toward a first passageway 88 located in the midsection 78 of portion 70.

The midsection 78 is comprised of the first passageway 88, a second passageway 90, and elongated fins 92 extending downwardly from the bottom surfaace thereof as shown in FIG. 2. Additionally, the midsection 78 has attachment flanges 94 and 96 by which the entire portion 70 is coupled to the central portion 98 of the vehicle frame 12.

The end cap 80 of portion 70 is secured to the rear end of the midsection 78 by suitable fasteners and functions to divert the liquid coolant flowing rearwardly of the vehicle through the first passageway 88 into a transverse flow direction to the second passageway 90 of the portion 70. As shown in FIG. 3, from the second passageway 90 the coolant flows forwardly and then through the outlet pipe 84 into the connecting conduit 74 and then into the second portion 72.

Since portion 72 is essentially the mirror image of portion 70, it will not be described in detail; however, as shown in FIG. 3, the liquid coolant flows along a similar path via a forward piece 100, a third passageway 102, an end cap 104, a fourth passageway 106, and out the forward piece 100 into the second conduit 64 which is coupled to the engine 18.

Referring now to FIG. 2, the elongated fins 92 extending downwardly from the bottom surface of the portions 70 and 72 directly below the passageways are located in two elongated slots 108 and 110 which are formed in the central portion 98 of the vehicle frame 12. As shown in this figure, the central portion is substantially planar and is preferably formed of a thermally conductive material such as aluminum or other suitable material. The attachment flanges 94 and 95 on both of the portions 70 and 72 are preferably riveted to the central portion adjacent the edges of the elongated slots by means of rivets 112.

The bottom portion of the fins 92 extend substantially into the middle of the elongated slots, extend the length of the slots and along the full length of each midsection of the portions 70 and 72 directly below the passageways.

Preferably, enlarged portions 114 are provided on opposite sides of the midsection 78 adjacent the ends of the fins and the attachment flanges so that waste heat from the heat exchanger assembly may be conducted to the heat conducting central portion 98 which thereby acts as a heat sink for the heat exchanger assembly.

Referring again to FIG. 2, the cross-sectional configuration of each passageway is substantially rectangular with the bottom surface thereof having a plurality of curved portions formed by the tops of the elongated fins 92 which are substantially triangular in cross section and are evenly distributed along the width of the portions 70 and 72 and the width of the elongated slots 108 and 110. Each of the portions 70 and 72 comprising the heat exchanger assembly 60 is formed of a suitable heat conducting material and can be formed by extrusion to provide the reasonably complicated shape shown in FIG. 2.

Referring to FIGS. 1 and 2, the heat exchanger assembly 60 comprised of the first and second portions 70 and 72 are positioned above and directly communicate with, via elongated slots 108 and 110, the top run 56 of the endless track 16. The phrase "directly communicate" means that nothing separates the heat exchanger assembly from the top run of the endless track but clear space. Preferably, the length of the heat exchanger assembly 60 extends from substantially the forward portion of the top run rearwardly to substantially the end portion of the top run. The distance between the bottom of the elongated fins 92 and the top run is a matter of inches and can be in a range of about 3–5 inches.

OPERATION

Initially, when the engine 18 is activated, the coolant liquid is pumped from the engine to the heat exchanger assembly 60 via the first conduit 62. The liquid then flows into the forward piece 76, rearwardly of the vehicle along the first passageway 88, transversely of the vehicle through the end cap 80, forwardly of the vehicle through the second passageway 90, and out the first portion 70 into the connecting conduit 74. From there the liquid flows through the forward piece 100 of portion 72, through the third passageway 102, through the end cap 104, through the fourth passageway 106, out the forward piece 100 and into the second conduit 64. The liquid then returns to the engine 18 via this second conduit 64. As mentioned above, this flow is generated by a conventional pump located in the conventional liquid-cooled engine 18.

With this circulation being established, the coolant liquid leaving the engine in a heated state is cooled in the heat exchanger assembly by means of direct conduction of the liquid's heat to the heat conducting material comprising the heat exchanger assembly. However, once the vehicle's endless track is activated by engaging a suitable clutch mechanism and by being driven via the belt 52 coupled to the pulley 50 on the forward sprocket wheel 32 and the output pulley 30 on the engine, additional cooling of the heat exchanger assembly 60, and thus the liquid coolant, takes place by means of forced convection of air and streams of snow, ice and water generated by the track and its ribs moving in the orbital motion around the guide assembly formed by the sprocket wheels and the bogie wheel.

Specifically, since the endless track 16 has the ribs 40 thereon, these ribs tend to act as fan blades and create convection currents of air which move toward the bottom surface of the heat exchanger assembly 60 and into contact with the elongated fins 92. These currents of air, accordingly, tend to cool the bottom surface of the heat exchanger assembly, thereby enhancing the efficiency of the heat exchanging process located therein.

Furthermore, since the vehicle commonly travels on snow and ice, particles of this snow and ice are carried from the bottom run 54 in the endless track, by being encrusted in the track itself and the ribs thereof, and follow the endless track around the rear sprocket wheel 34. Due to centripetal forces, these particles are thrown from the endless track along the top run 56 into contact with the elongated fins 92 located on the bottom of the heat exchanger assembly, as indicated by the arrows in FIG. 2. Thus, the ice and snow, and any melted portions thereof in the form of water, are thrown into direct contact with these fins to thereby enhance the cooling of the heat exchanger assembly 60 and thus the cooling of the liquid coolant flowing therethrough. In addition to the centripetal forces created around the rear sprocket wheel 34, it is contemplated that additional centripetal forces are present as the top run 56 passes over the bogie wheel 36, thereby throwing various particles of ice, snow and water into contact with the remaining length of the heat exchanger assembly.

When the endless track is in the form shown in FIG. 2, with holes 44 and 46 for the sprockets 48 of the sprocket wheels, additional snow and ice are caught in these holes and are also thrown into contact with the bottom surface of the heat exchanger assembly 60.

In this manner, the liquid coolant of the endless track vehicle's liquid-cooled engine 18 is efficiently cooled by means of the heat exchanger assembly 60.

EMBODIMENT OF FIGS. 4 AND 5

Figure 5:
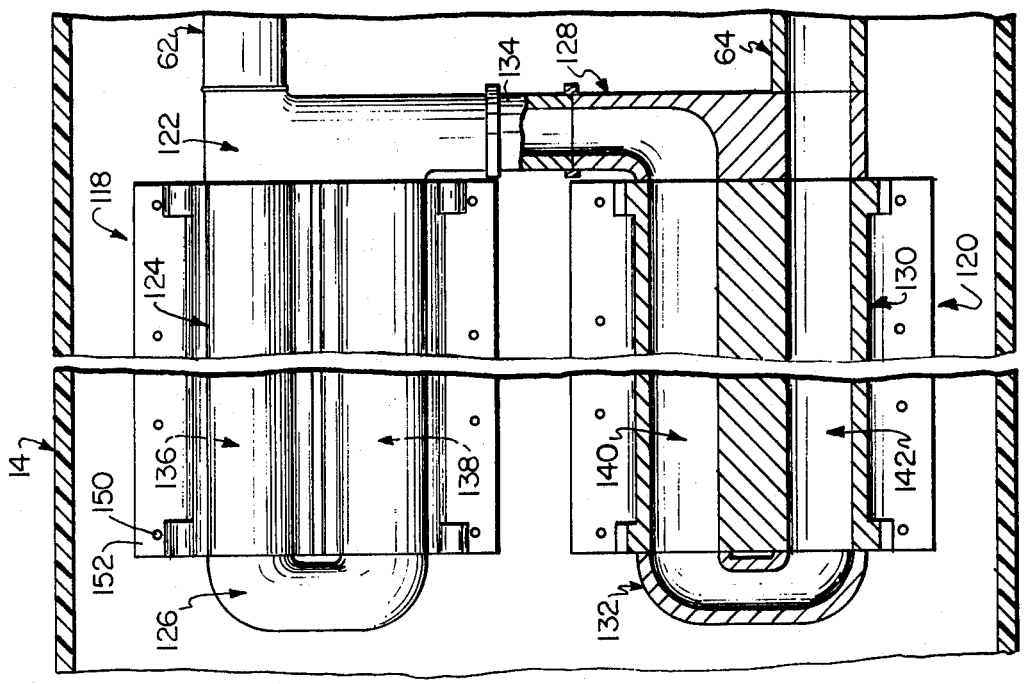
FIG. 5 is a fragmentary top, sectional view of the second embodiment of the heat exchanger assembly taken along lines 5—5 in FIG. 4.
Figure 4:
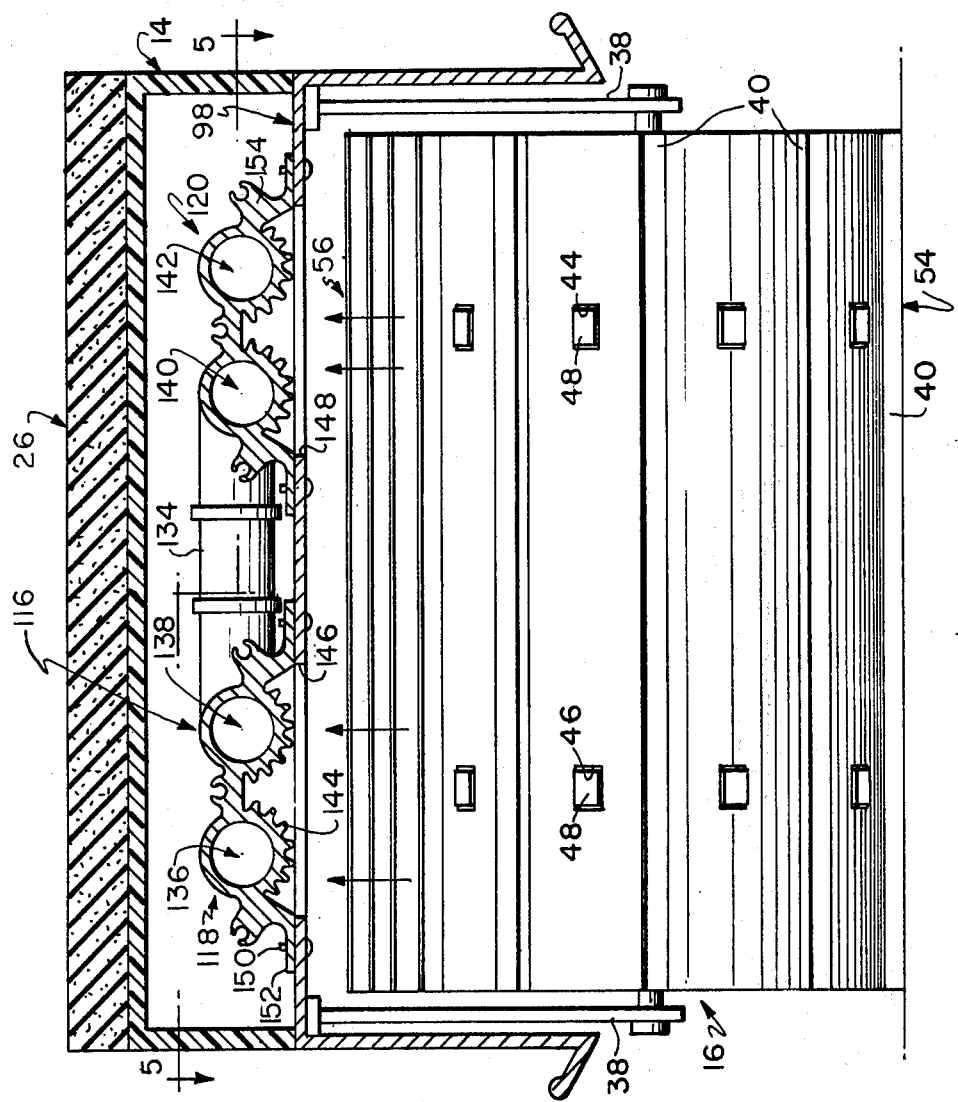
FIG. 4 is a sectional view similar to FIG. 2 but shows a second embodiment of the heat exchanger assembly.

The second embodiment of the heat exchanger assembly 60 shown in FIGS. 4 and 5 is basically similar to the embodiment illustrated in FIGS. 2 and 3; however, the cross sections of the passageways are circular and the elongated fins are distributed in a substantially curvilinear configuration.

Specifically, as shown in FIG. 5, this embodiment comprises a housing 116 including a first portion 118 and a second portion 120. The first portion includes a forward piece 122, a midsection 124, and an end cap 126. The forward piece 122 is coupled to the first conduit 62 of the circulation assembly leading from the engine 18.

The second portion 120 is comprised of a forward piece 128, a midsection 130, and an end cap 132. The forward piece 128 of this second portion is coupled to the second conduit 64 which is in turn coupled to the liquid-cooled engine 18. The forward piece 122 of the first portion 118 is interconnected with the forward piece 128 of the second portion 120 via connecting conduit 134.

The first portion 118 defines a first passageway 136 and a second passageway 138, as shown in FIG. 4. Similarly, the second portion 120 defines a third passageway 140 and a fourth passageway 142. Each of these passageways is circular in cross section and has a plurality of elongated fins 144 extending from the bottom surface of the midsections containing these passageways along a substantially semi-circular angular extension. These fins extend from one end of the midsections to the other and are located directly above elongated slots 146 and 148 formed in the central portion 98 of the vehicle frame 12.

Each of the portions 118 and 120 is mounted to the top of the central portion 98 of the frame via rivets 150 passing through attachment flanges 152 on the sides of the portion, as shown in FIGS. 4 and 5.

Additionally, the first portion 118 and second portion 120 both have enlarged portions 154 located adjacent the attachment flanges 152 such that the heat exchanged from the liquid coolant to the material of the portions is conducted through these enlarged portions 154 along the attachment flanges 152 and to the central portion 98 of the vehicle frame which thereby acts as a heat sink for the vehicle.

The operation of the heat exchanger assembly of this embodiment is substantially as described above with regard to the embodiment of FIGS. 2 and 3.

EMBODIMENT OF FIGS. 6 AND 7

Figure 7:
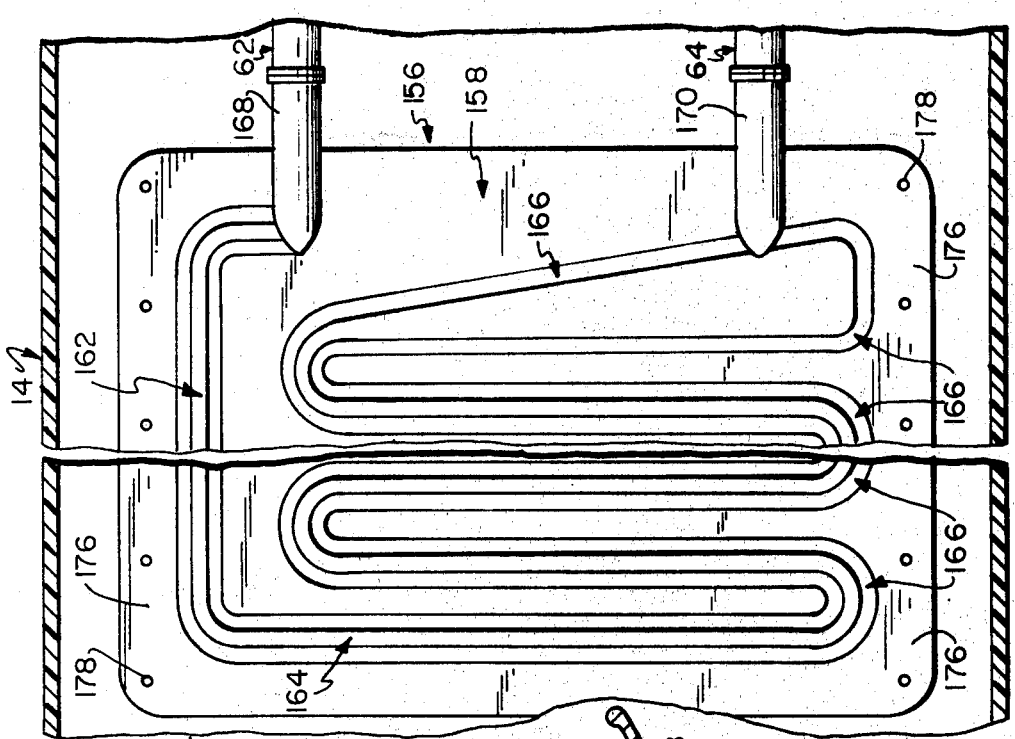
FIG. 7 is a fragmentary top, sectional view of the third embodiment of the heat exchanger assembly taken along lines 7—7 in FIG. 6.
Figure 6:
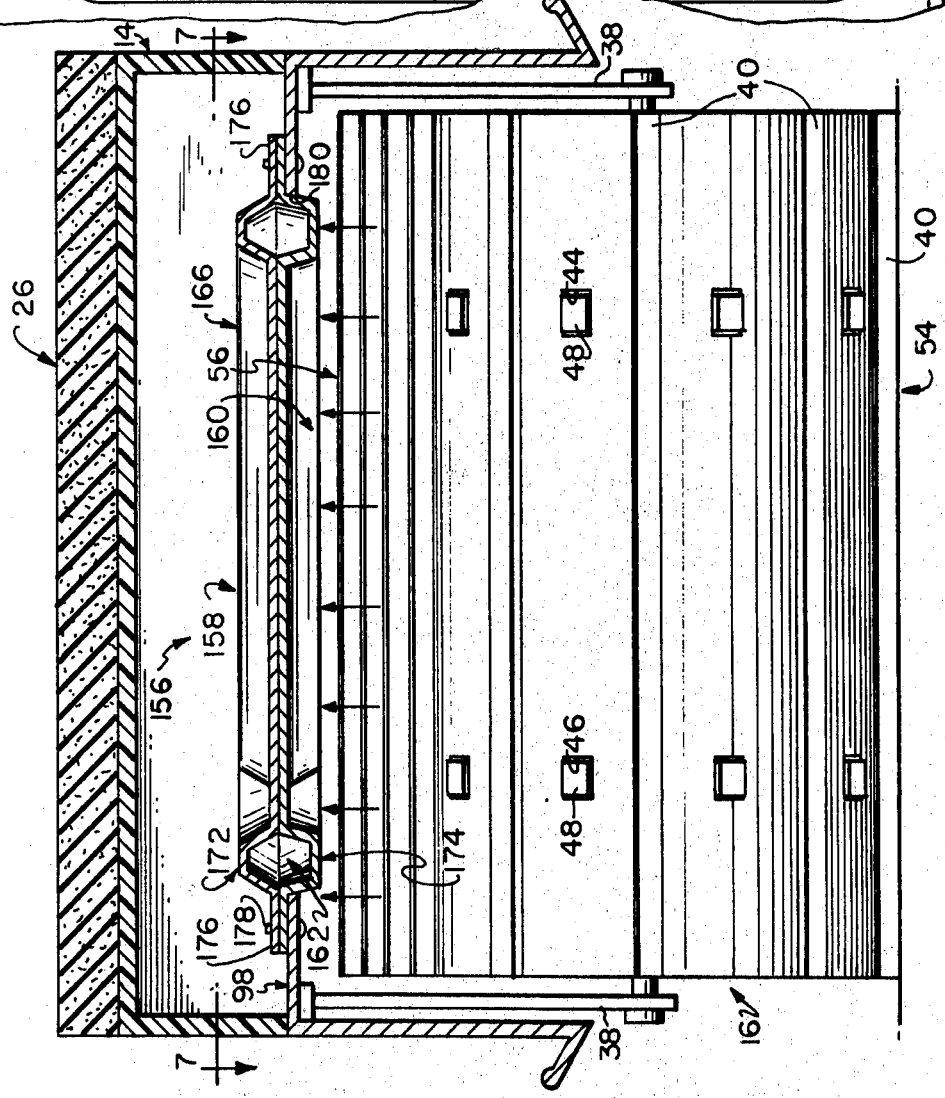
FIG. 6 is a sectional view similar to FIG. 2 but shows a third embodiment of the heat exchanger assembly.

A third embodiment of the heat exchanger assembly 60 is shown in FIGS. 6 and 7 and comprises a housing 156 formed from a top member 158 and a bottom member 160 which are suitably coupled together. These members may be formed by stamping and are made from a suitable high thermal conducting material.

As shown in FIG. 7, the housing 156 includes a first passageway 162 extending fore and aft of the vehicle, a second passageway 164 communicating with the first passageway and extending at 90° to the first passageway and a plurality of additional passageways 166 interconnected to each other and the second passageway which are also 90° to the first passageway. At the front of the first passageway 162 is an inlet pippe 168 directly communicating with the first passageway and the first conduit 62 which is connected to the liquid-cooled engine 18. Additionally, the last of the additional passageways 166 is directly coupled to an outlet pipe 170 which is in turn connected to the second conduit 64 coupled to the engine 18.

Referring now to FIG. 6, the cross-sectional configuration of each of the passageways in the housing 156 is polygonal and is shown as a hexagon including a top surface 172 and a bottom surface 174, the bottom surface having a width greater than the top surface 172.

The housing 156 is mounted on the central portion 98 of the vehicle frame by means of attachment flanges 176 and rivets 178 in an elongated slot 180 formed in the central portion 98. Thus, the bottom surface of the heat exchanger assembly formed by housing 156 is positioned above and directly communicates with the top run of the endless track as described above with regard to the first and second embodiments of the heat exchanger assembly. In this embodiment, since the bottom surface 174 of each of the passageways is larger than the top surface thereof, a greater degree of heat exchange is accomplished at the bottom surface 174 which is exposed to the air, ice, water and snow directed to this surface by means of the movement of the endless track 16.

The operation of the heat exchanger assembly embodied in FIGS. 6 and 7 is substantially the same as that described above for the embodiment of FIGS. 2 and 3 and in the case of this third embodiment of FIGS. 6 and 7 the liquid coolant flows through the inlet pipe 168, along the first passageway 162, then along the second passageway 164, then through the plurality of additional passageways 166, out the last additional passageway via outlet pipe 170, and returns to the engine 18 via the second conduit 64.

EMBODIMENT OF FIGS. 8 AND 9

Figures 8, 9:
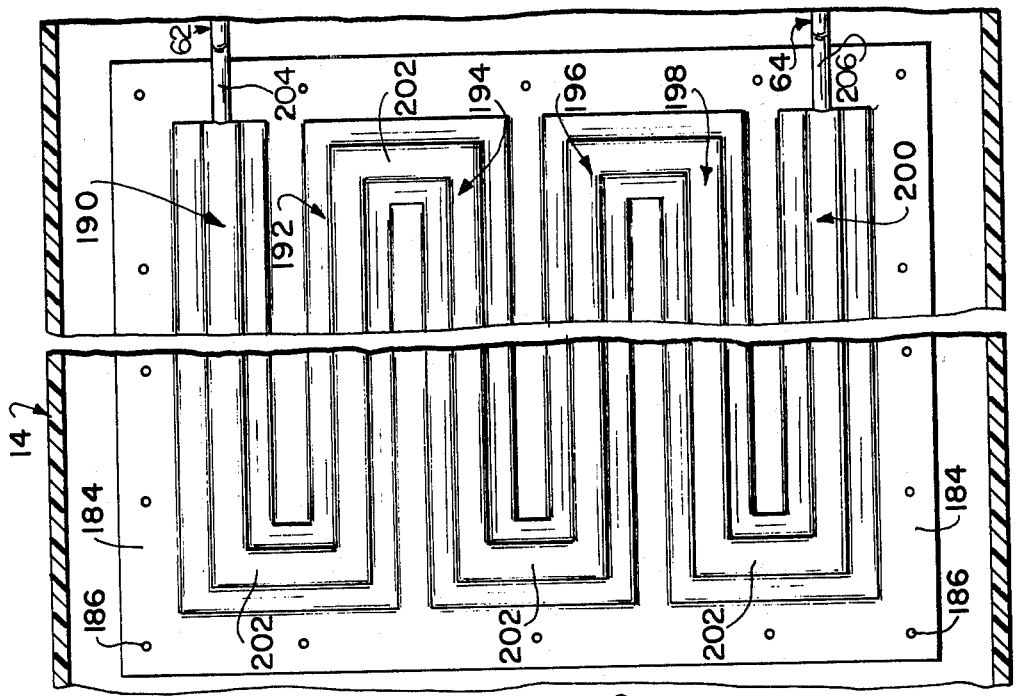
FIG. 8 is a sectional view similar to FIG. 2 but shows a fourth embodiment of the heat exchanger assembly.
FIG. 9 is a fragmentary top, sectional view of the fourth embodiment of the heat exchanger assembly taken along lines 9—9 in FIG. 8.

A fourth embodiment of the heat exchanger assembly 60 of this vehicle 10 is shown in FIGS. 8 and 9 and is similar to the previous embodiments; however, in this embodiment the central portion 98 of the vehicle frame 12 does not contain elongated slots and the central portion itself forms the bottom surface of the heat exchanger assembly.

Specifically, as shown in FIG. 8, the heat exchanger assembly is formed by a housing 182 coupled to the central portion 98 of the vehicle frame 12. The housing can be aluminum, steel or plastic with the trapezoid-shaped indentations formed therein by stamping. The outer periphery of the housing 182 forms an attachment flange 184 which is coupled to the central portion 98 via rivets 186. A gasket 188 is interposed between the attachment flange 184 and the top of the central portion 98 so as to seal these two members. Instead of the gasket, a resilient sealant, such as silicone cement, may be utilized.

As shown in FIG. 9, the housing 182 and the central portion 98 form a plurality of passageways 190, 192, 194, 196, 198 and 200 which run fore and aft of the vehicle and are interconnected by means of short passageways 202 running perpendicular to these passageways. An inlet pipe 204 interconnects the first passageway 190 with the first conduit 62 coupled to the engine 18 and an outlet pipe 206 couples the last passageway 200 with the second conduit 64 coupled to the engine 18.

Referring again to FIG. 8, the cross-sectional view of each of the passageways shows that the central portion 98 forms the bottom surface, or base, of a trapezoid which results in passageways having a trapezoidal cross section. The large base of the trapezoid is the bottom portion which enhances the heat exchanging capabilities of this embodiment of the heat exchanger assembly. The two sides of the trapezoid are equal.

As similarly described above, in operation the liquid coolant flows into the first conduit 62, through the various passageways defined by the housing 182 and the central portion 98 and then back to the engine 18 via the second conduit 64. Additionally, the heat exchanging of the liquid coolant is accomplished in substantially the same way with the various air, ice, snow and water being transferred into contact with the bottom of the heat exchanger assembly, in this case the bottom of the central portion 98, by means of the orbital movement of the endless track 16. While the benefit of the elongated fins does not exist with this embodiment, due to the flaring sides of the passageways in the form of trapezoids, the additional surface area of the central portion 98 exposed to the liquid coolant more than offsets the loss of the fins from the heat exchanger assembly. Additionally, this embodiment acts as a cost reduction since it requires less material and assembly time.

Figure 10:
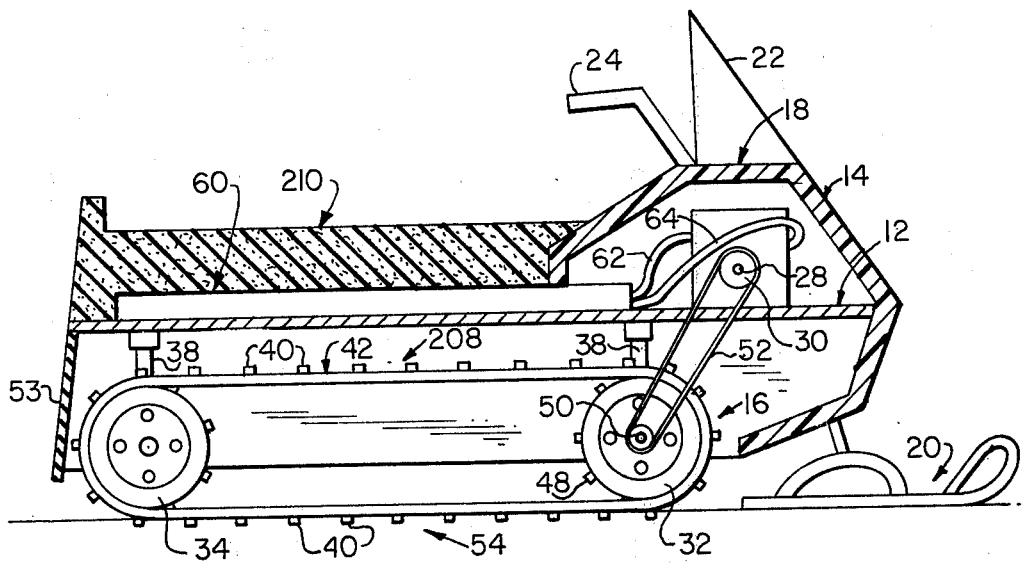
FIG. 10 is a vertical sectional view in side elevation of an endless track vehicle similar to that shown in FIG. 1 but having a modified track support and cushioned seat placement.

Referring now to FIG. 10, an endless track vehicle is shown which is similar to that illustrated in FIG. 1 except that the bogie wheel 36 is eliminated and the cushioned seat is positioned differently. Similar elements of the vehicles of FIGS. 1 and 10 are given the same character numerals.

While it is advantageous to form the top run of the endless track 16 in two non-coplanar portions as discussed above, this is not absolutely necessary. Accordingly, with bogie wheel 36 removed, a top run 208 is formed which is substantially parallel to the bottom run 54 which contacts the snow or similar substance upon which the vehicle travels. The vehicle operates essentially the same way as discussed above, with cold air, snow, water and ice being forced into contact with the bottom of the heat exchanger 60.

In this embodiment of FIG. 10, the cushioned seat 210 is located directly on the top of the heat exchanger 60 which helps to warm the driver of the vehicle sitting on the seat.

Preferably the distance between the bottom of the heat exchanger assembly 60 and the top of the endless tracks top run 208 is about 3–5 inches. Since this distance is rather smaller, not only will the snow, ice and water be thrown into contact with the heat exchanger (in both of the vehicles shown in FIGS. 1 and 10), but some portions of snow and ice encrusted to the endless track will span the distance to the bottom of the heat exchanger and directly contact the heat exchanger.

While various embodiments have been chosen to illustrate the invention, it will be understood by those skilled in the art that various changes and modifications can be made therein without departing from the scope of the invention as defined in the appended claims.

What is claimed is:

1. An endless track vehicle adapted to be driven by a liquid-cooled engine on snow, the combination comprising
   a vehicle frame;
   an endless track having upstanding ribs extending from the outer surface thereof;
   guide means coupled to said frame for guiding said track in orbital movement, said orbital movement including a top run and a bottom run, said bottom run supporting the vehicle on the snow;
   a liquid-cooled engine coupled to said frame;
   drive means, coupling said endless track and said engine, for driving said endless track in the orbital movement;
   heat exchanger means, coupled to said frame, for cooling the liquid used in said engine; and
   circulation means for circulating the liquid between said engine and said heat exchanger means,
   said heat exchanger means being positioned so that the bottom surface thereof is above and directly communicating with said top run of said endless track and spans substantially the entire width of said top run and spans substantially the entire length of said top run so that the bottom surface of said heat exchanger means is cooled via contact with convection currents of air generated by the movement of said ribs with the orbital movement of said endless track and contact with streams of water, ice and snow thrown by said ribs during the orbital movement of said endless track.

2. A vehicle according to claim 1 wherein
   said endless track has apertures therein; and
   said guide means includes a plurality of rollers having teeth around the peripheries thereof for engagement of said apertures so that snow, ice and water are thrown from said apertures into contact with said bottom surface of said heat exchanger means.

3. A vehicle according to claim 1, wherein said top run has two non-coplanar portions.

4. A vehicle according to claim 1, wherein said top run is substantially parallel to said bottom run.

5. A vehicle according to claim 1, wherein
   said heat exchanger means comprises means defining a housing for the conduction of the liquid;
   said housing having a plurality of connecting elongated passageways therein; and
   said housing being formed of heat conductive material.

6. A vehicle according to claim 5, wherein said passageways are polygonal in cross section.

7. A vehicle according to claim 5, wherein said passageways have curvilinear sides.

8. A vehicle according to claim 5 wherein
   said heat exchanger means further comprises a plurality of elongated fins projecting downwardly from the bottom thereof and located directly below said passageways.

9. A vehicle according to claim 5 wherein
   said passageways are substantially rectangular in cross section.

10. A vehicle according to claim 5 wherein
    said passageways are circular in cross section.

11. A vehicle according to claim 5 wherein
    said passageways are hexagonal in cross section.

12. A vehicle according to claim 5 wherein
    said passageways are trapezoidal in cross section.

13. A vehicle according to claim 5 wherein
    said housing is mounted on a central portion of said vehicle frame;
    said heat exchanger means and said top run of said endless track directly communicate through means defining at least one slot in said central portion of said vehicle frame; and
    said central portion is formed of heat conductive material.

14. A vehicle according to claim 13, wherein
    said heat exchanger means includes a plurality of enlarged portions adjacent the coupling of said housing and said central portion for conducting heat to said central portion.

15. A vehicle according to claim 5, wherein
    said vehicle frame includes a continuous central portion located directly above said top run of said endless track; and
    said central portion forms the bottom of said passageways and is formed of heat conductive material.

16. A vehicle according to claim 15 wherein
    said passageways are trapezoidal in cross section; and
    said central portion defines the longest side of said trapezoidal cross-sectional passageways.

* * * * *